(No Model.)
R. W. ERMELING.
CORN HARVESTER.
No. 478,849. Patented July 12, 1892.
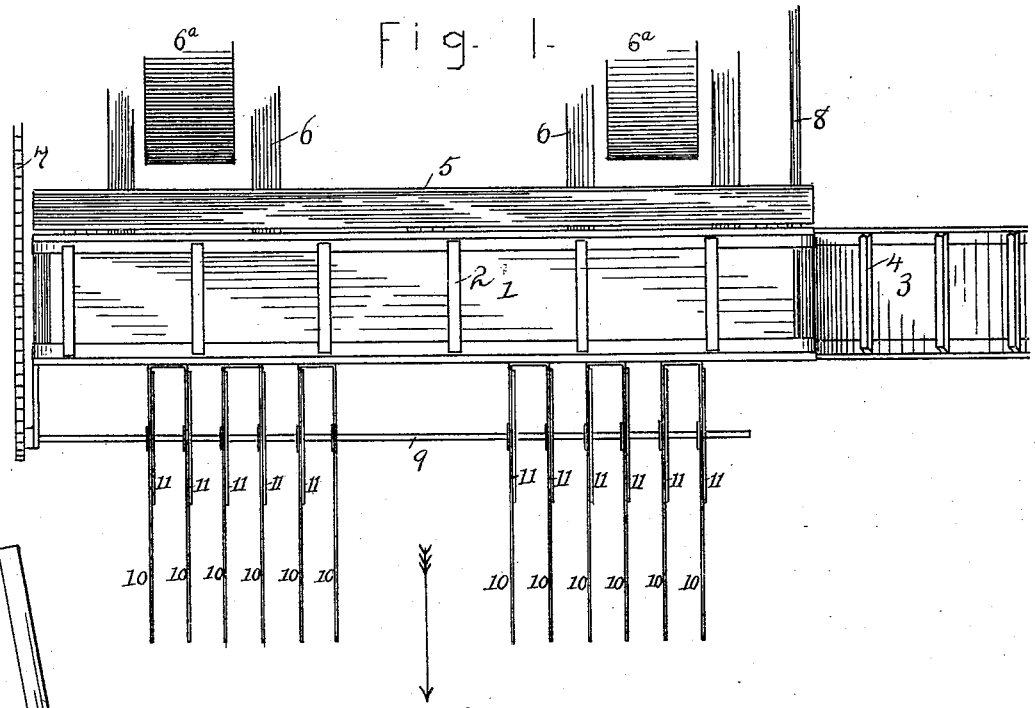
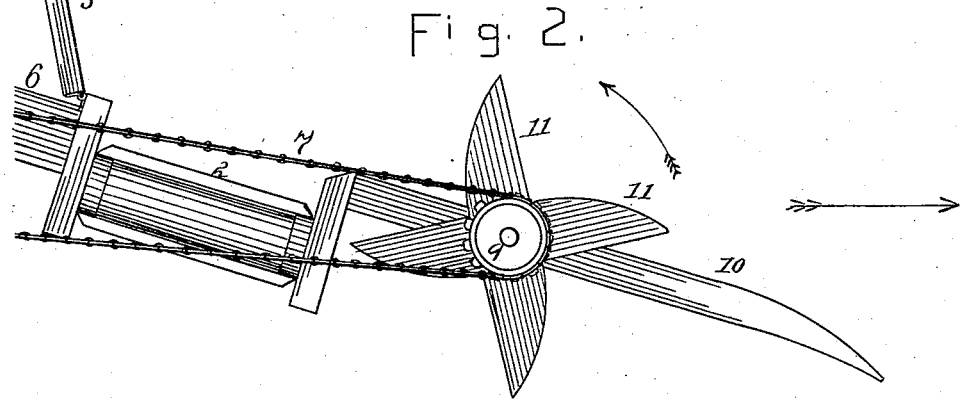
ATTEST.
Helen Graham
W. W. Graham.
INVENTOR
R. W. ERMELING.
By his attorney
L. P. Graham

UNITED STATES PATENT OFFICE.

RICHARD W. ERMELING, OF BATH, ILLINOIS.

CORN-HARVESTER.

SPECIFICATION forming part of Letters Patent No. 478,849, dated July 12, 1892.

Application filed February 19, 1892. Serial No. 422,087. (No model.)

*To all whom it may concern:*

Be it known that I, RICHARD W. ERMELING, of Bath, in the county of Mason and State of Illinois, have invented certain new and useful Improvements in Corn-Harvesters, of which the following is a specification.

This invention is designed to provide means for stripping corn from the stalks and conveying it to a wagon. It is intended to be operated after the manner of a header for harvesting small grain; and it consists in the details of construction and combinations of parts hereinafter set forth and claimed.

In the drawings accompanying and forming a part of this specification, Figure 1 is a plan of my invention, and Fig. 2 is an enlarged end view thereof.

The conveyer-bed 1 is similar to the corresponding part of a header, and it has the carrier-belt, drag, or apron 2, which conveys the corn to elevator 3. The elevator has the carrier 4, which receives the corn from the conveyer and delivers it to a wagon. A lid 5 covers the conveyer when the machine is not in use and acts as a fender when raised to prevent the gathered corn from being thrown over the conveyer by the action of the cutters. Bars 6 form part of the carrying-frame which is to be mounted on wheels and regulated and guided the same as a header-frame. Fragments of the main wheels are shown at 6ª. Chain 7 conveys motion from the main wheels to shaft 9. Shaft or tumble-rod 8 imparts motion from the main wheels to the conveyer and elevator. Fingers 10 project forward and downward from the conveyer-bed and provide bearings for shaft 9. Rotary cutters 11 are fixed on shaft 9 adjacent to the fingers, and they are driven in the direction indicated by the curved arrow in Fig. 2. The entire device is adjustable after the manner of a header, in order to bring the points of the fingers the desired distance from the ground.

The operation of the device is as follows: The machine is propelled in the direction indicated by the straight arrows in the drawings, with each set of fingers in line with and operating on a row of corn. The fingers straighten the stalks and guide the ears to the cutters, and the cutters sever the ears from the stalks and deliver the ears to the conveyer. The conveyer carries the ears to the elevator and the elevator delivers them to a wagon driven parallel with the harvester.

The vertical position of the bearings of the shaft and the speed of the rotation of the cutters may both or either be varied in order to properly deliver the corn to the conveyer by the motion of the cutters.

I claim—

The combination of a transverse conveyer and elevator, fingers projecting forwardly from the conveyer, a transverse shaft carried by the fingers, cutters fixed on the shaft adjacent to the fingers, and a lid for the conveyer adapted to act as a fender for the corn when raised, as set forth.

In testimony whereof I sign my name in the presence of two subscribing witnesses.

RICHARD W. ERMELING.

Attest:
JOHN H. DIERKER,
JUNIUS B. HARMISON.